United States Patent [19]

Cochran et al.

[11] Patent Number: 4,803,687
[45] Date of Patent: Feb. 7, 1989

[54] THERMALLY BUFFERED SODIUM-NEON LASER TARGET FOR COHERENT X-RAY PRODUCTION

[75] Inventors: Frederick Cochran, Alexandria; Jack Davis, Annandale; John Aprugese, Springfield, all of Va.

[73] Assignee: The United States of America as represented by the Secretary of the Navy, Washington, D.C.

[21] Appl. No.: 795,795

[22] Filed: Nov. 7, 1985

[51] Int. Cl.$^4$ .............................................. H01S 3/30
[52] U.S. Cl. ........................................ 372/5; 372/34
[58] Field of Search .................. 372/5, 34, 39, 55, 68, 372/70; 378/119

[56] References Cited

U.S. PATENT DOCUMENTS

| | | | |
|---|---|---|---|
| 4,206,364 | 6/1980 | Dixon et al. | 372/5 |
| 4,229,708 | 10/1980 | Mani et al. | 372/5 |
| 4,535,023 | 8/1985 | Whitlock | 372/39 |
| 4,589,113 | 5/1986 | Hagelstein | 372/5 |
| 4,592,056 | 5/1986 | Elton | 372/5 |

OTHER PUBLICATIONS

Sov. J. Quantum Electron. 11(1) Jan. 1981, Amn. Inst. of Physics, pp. 48-52 "Search for Amplification in the Far Vacuum Ultraviolet Due to Transitions of Multiply Charged Ions in an Extended Laser Plasma", A. N. Zherikhin, K. N. Koshelev, P. G. Kryukov, V. S. Letokhov, and S. V. Chekalin.

IEEE Journal of Quantum Electronics, vol. QE-19, No. 12, Dec. 83, "Population Inversion and Gain Measurements for Soft X-Ray Laser Development in a Magnetically Confined Plasma Column," pp. 1855-1859.

Cochran, F. L., et al., "X-ray Lasing in a Na/Ne Plasma Environment," *Journal of Applied Physics*: vol. 57, No. 1, 1/1/85, p. 27.

Apruzese, J. P., et al., "Plasma Conditions Required for Attainment of Maximum Gain in Resonantly Photo--Pumped Aluminum XII and Neon IX" *Journal of Applied Phys.*, vol. 53, No. 6, Jun. '82, p. 4020.

Chapline, G., et al., "X-ray Lasers," *Physics Today*, Jun. '75, p. 40.

Primary Examiner—William L. Sikes
Assistant Examiner—B Randolph
Attorney, Agent, or Firm—Thomas E. McDonnell; Peter T. Rutkowski

[57] ABSTRACT

A carbon layer between a neon layer and a sodium layer serves as a thermal buffer therebetween to enable the neon layer to remain at a lower temperature and density to allow for the generation of coherent x-rays. A high powered laser heats the sodium layer which acts as a flashlamp for direct photon pumping of the neon layer. The neon layer, heated by a lower powered laser, then lases at about 58, 82, and/or 230 angstroms.

6 Claims, 3 Drawing Sheets

THERMALLY BUFFERED SODIUM-NEON LASER TARGET FOR COHERENT X-RAY PRODUCTION

BACKGROUND OF THE INVENTION

The present invention relates to the generation of coherent x-rays. More specifically, the present invention relates to direct photon pumping in a Na-Ne system where a thermal buffer is inserted therebetween.

For many years now, there have been a variety of proposed schemes suggesting ways to create a population inversion and subsequent gain in the x-ray region. (A population inversion exists when the upper energy level in a transition is overpopulated relative to the lower energy level and is a necessary requirement for lasing to occur.) U.S. Pat. No. 4,206,364 to Dixon et al. describes a one sided laser irradiation scheme using tungsten blocks to create a channel for plasma from a carbon target. Population inversion occurs in the expanding carbon plasma. U.S. Pat. No. 4,229,708 to Mani et al. concerns producing lithium-like atoms or ions using one-sided soft x-ray photon fluxes.

Another scheme involves the flashlamp concept where the radiated flux from one plasma pumping another plasma creates conditions which result in coherent radiation in the soft x-ray regions. See A. V. Vinogradov, I. I. Sobel'man, and E. A. Yokov, Sov. J. Quantum. Electron 5, 59 (1975); B. A. Norton and N. J. Peacock, J. Phys. B 6, 989 (1975); J. P. Apruzese, J. Davis, and K. G. Whitney, J. Phys, B 11, L643 (1978); R. H. Dixon and R. C. Elton, J. Opt. Soc. Am. B 1, 232 (1984), and references therein. There are several cases where the coincidence between the pumping and absorbing lines is close enough to merit strong consideration as a possible lasing combination. For example, K-shell lines from Mg, Al, or Si are reasonably well matched to several fluorinelike Kr lines. Two such schemes utilize a Si XIII-Al III system and a Na X-Ne IX system. The Na-Ne scheme is particularly interesting because the lines match to two parts in $10^4$ at a wavelength of 11 angstroms. An energy level diagram of this scheme is shown in FIG. 2.

In the Na-Ne approach, photons emitted from one element (Na) impinge upon and pump the upper lasing level of the second element (Ne). This is one of the most promising approaches but it has not succeeded because the conditions required in the pumped and pumping plasmas are drastically different and therefore difficult to acheve when they are in close physical proximity.

More specifically, the higher temperature that is present in order for the Na to function as a pump will propagate in a thermal wave over a finite time into the Ne creating an overall isothermal state which precludes the Ne from being at the lower temperature and density necessary to produce the desired x-ray lasing. This is particularly disastrous if the Ne is in contact with the Na. However, if the two materials are separated by any appreciable distance, then the efficiency of the system is lost due to solid angle effects.

SUMMARY OF THE INVENTION

Accordingly, one object of the present invention is to generate coherent x-rays.

Another object of the present invention is to use Na and Ne to produce x-rays.

Yet another object of the present invention is to provide a thermal buffer between Na and Ne to prevent the Na from heating and overionizing the Ne and precluding the generation of coherent x-rays.

These and other objects of the present invention are accomplished with an apparatus for generating coherent x-rays comprising: an Na layer; an Ne layer; a thermal transparent buffer layer located between and in contact with the Na layer and the Ne layer wherein the Ne layer is maintained at a lower temperature and density than the Na layer; a lower power laser to heat the Ne layer until Ne IX is present; and a higher power laser to heat the Na layer until Na X is present.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
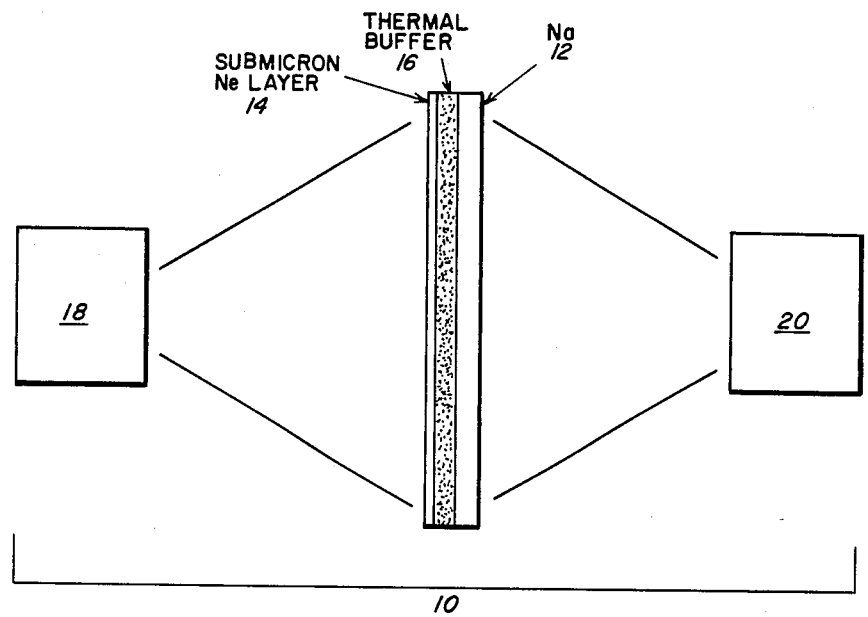
FIG. 1 is a schematic view of the Na-C-Ne x-ray lasing system.

Referring now to the drawings, wherein like reference numerals designate identical or corresponding parts throughout the several views, and more particularly to FIG. 1 thereof, there is shown an apparatus for generating coherent x-rays. The apparatus 10 comprises an Na layer 12, an Ne layer 14, and a thermal non-opaque buffer layer 16 that is located between and in contact with the Na layer and the Ne layer. A laser 18 having power less than or equal to $10^{12}$ W/cm² heats the Ne layer and a higher power laser 20 having power greater than or equal to $5 \times 10^{13}$ W/cm² heats the Na layer. The heated Na layer acts as a flashlamp to directly photopump the ablated Ne layer, thus generating coherent x-rays. The transparent thermal buffer layer 16 allows the Na layerand Ne layer to coexist at the drastically different conditions necessary for the x-ray lasing to occur since the Ne layer requires a lower temperature and density for operation than the Na layer. Without the thermal buffer layer 16, an isothermal condition would exist across the Na-Ne layers precluding the generation of x-rays. The lasing system is to be contained within an evacuated chamber with a frozen layer of Ne on one side of the Na layer buffer layer combination. (The chamber is kept cold enough to keep the Ne frozen until laser heating begins. The Ne has to be frozen in order for the electron density of the Ne to be above its critical density). The driving lasers enter the chamber through ports which are located in the chamber wall.

Figure 3:
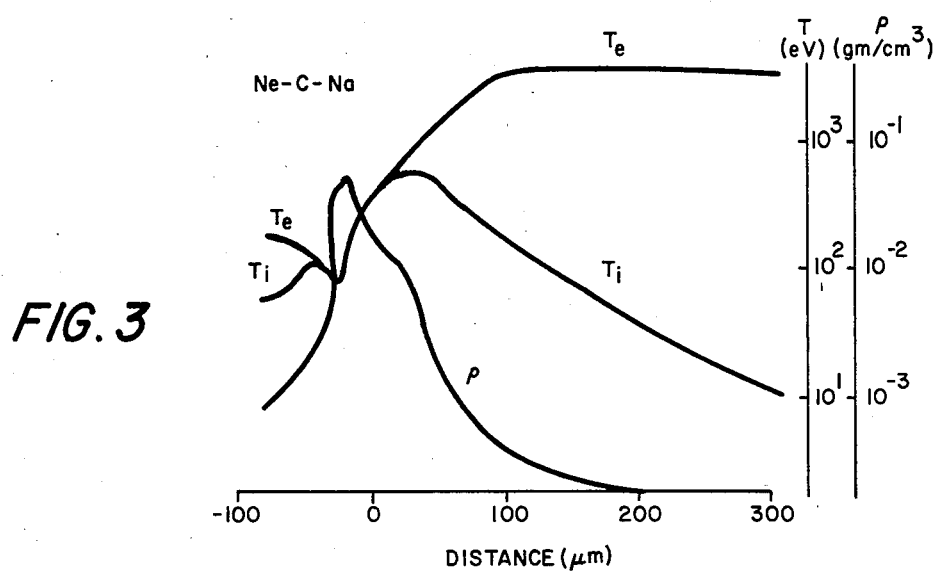
FIG. 3 is a graph of density and temperature profiles for one of several possible Na-C-Ne cases.

More specifically, the lower power laser 18 acts to create a tenuous Ne blowoff while the higher power laser 20 provides an energy source to heat the Na 12. The sodium then acts as a backlighting flashlamp for neon. Lasers which operate in the 0.25–1.0 μm range are well suited for this task since absorption of the beam can be tailored to the requirements of the system. In actual operation absorption of laser 18 operating at a relatively low intensity in comparison with laser 20 will ablate the neon at a low temperature, typically about 100 eV. At the same time a higher-powered laser will heat the sodium plasma to a higher temperature which then serves as the backlighting pump source. Of course, within a finite time, the thermal wave will propagate through the sodium and into the neon. This isothermal state precludes the conditions which are necessary for achieving gain. To alleviate this problem, a third material 16 is placed between the Na-Ne interface. This material 16 acts as a thermal buffer while allowing the pumping radiation to pass through without significantly reducing the pumping intensity. The requirements the material 16 must fulfill are as follows. First, the material is chosen to be a solid which is both thick enough to absorb the thermal wave from the heated sodium 12 and keep it from reaching the neon 14. Thus, a material of approximately the same thickness and density as that of the original sodium is appropriate and allows for a thermal penetration time through the material to be roughly equal to that for the sodium. Second, the material should be relatively low in Z, where Z is the number of protons in the nucleus, so that opacity effects do not significantly impede the pumping line. A material such as carbon is ideal for this purpose. For example, the specific heat of carbon is approximately equal to that of the sodium and thus, allows the unwanted thermal energy of the sodium to be absorbed. Also, the photon cross section of cold carbon at 11 angstroms (i.e., the pumping line) is approximately $2 \times 10^3$ cm$^2$/g. Thus, for linear distances less than 2.2 $\mu$m, solid carbon (2.2 g/cm$^3$) can be considered to be thin to the pumping line. That is, the optical depth is less than or equal to one for this thickness and the attenuation of the pumping line is less than or equal to one e-folding. This distance can be lengthened if, for instance, CH is used in which case the corresponding carbon density is decreased. During the operation of the laser, the carbon layer 16 absorbs the energy of the thermal wave that results from the absorption of the laser beam of laser 20 in the sodium 12. Thus, the carbon is heated to above 10 eV as shown in FIG. 3. The absorption of this thermal energy by the carbon, however, prevents overheating of the neon.

Figure 2:
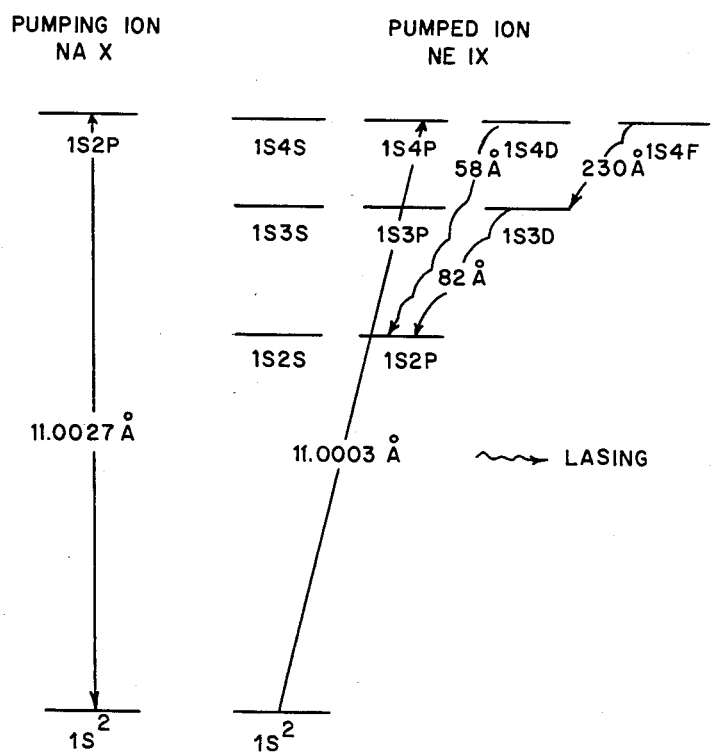
FIG. 2 is a schematic drawing of the relevant energy level diagram for the Na-Ne scheme.

In the determination of the thickness of the Ne layer 14 and the Na layer 12 the gain versus density relationships in each material are provided in J. P. Apruzese, J. Davis, and K. G. Whitney, J. Appl. Phys. 53, 4020 (1982). Optimally, the greatest gain for a given density of material is sought to maximize the efficiency of the system. The relationships given there, without presence of a thermal buffer layer, are also the controlling relationships when a thermal buffer layer is present. Thus the scale length should not be greater than 10 $\mu$m for ion densities on the order of $10^{20}$ cm$^{-3}$. (The scale length is a measure of the distance over which the density is changing. Thus, the distance over which the density drops from $10^{20}$ cm$^{-3}$ to $10^{19}$ cm$^{-3}$ would be 0.9 of a scale length. Hence, a 10 $\mu$m scale length would mean a drop from $10^{20}$ cm$^{-3}$ to $10^{19}$ cm$^{-3}$ over a distance of roughly 10 $\mu$m.) The scale length can increase to greater than 0.1 cm for ion number densities on the order of $10^{18}$ cm$^3$. (For a given amount of material within 10 $\mu$m at a density of $10^{20}$ cm$^{-3}$, expansion of the material so that the density is $10^{18}$ cm$^{-3}$, gives a distance of $10^3$ $\mu$m or 0.1 cm.) FIG. 2 is a schematic diagram of the key energy levels for the Na-Ne scheme. The gain coefficients for the Ne IX 1s2p$^1$p-1s3d$^1$D and 1s2p$^1$P-1s4d$^1$D transitions peak near an ion density of $10^{20}$ cm$^{-3}$. The 1s3d$^1$D-1s4f$^1$D gain which peaks near $10^{19}$ cm$^{-3}$, subsequently drops off dramatically to less than unity at $10^{16}$ cm$^{-3}$ but is still greater than 10 at $10^{18}$ cm$^{-3}$. The terminology of, for instance, 1s2p$^1$P is well known. The numbers in front of the lowercase letters represent principal quantum numbers. The lowercase letters, here s and p, represent the angular momentum associated with the principal quantum numbers in the atomic configuration. The uppercase symbol, here P, designates the total atomic angular momentum. The superscripted number next to that symbol, here 1, refers to the multiplicity of the configuration. This number takes on the value 2S+1 were S is the total spin of the atom. When more than one electron occupies a given angular momentum value for a principal quantum number, a superscript is used to designate the number of electrons as in the 1s$^2$ $^1$S ground state. FIG. 2 shows that Na X, when it is heated by laser 20, has a resonant transition from a ground state of 1s$^2$ $^1$S to an excited state of 1s2p$^1$P at 11.0027 angstroms and then returns to the ground state of 1s$^2$ $^1$S, but in the process of returning to the ground state releases a photon at 11.0027 angstroms. Referring to the Ne X energy levels shown in FIG. 2, the Ne IX is resonantly photo-pumped at 11.0003 Angstroms from ground state of 1s$^2$ $^1$S to 1s4p$^1$ 1P. The resulting inversion results in transitions at 58 angstroms (1s2p$^1$P-1s4d$^1$D), 230 angstroms (1s3d$^1$D-1s4f$^1$D) and 82 angstroms (1s2p$^1$P-1s3d$^1$D). It is to be noted that the Na layer contains a significantly greater mass than the Ne layer which must be cryogenic at solid densities. Hence, the choice of Na for use as the pumping source allows for easier target construction and manipulation.

Only Na X and Ne IX are of interest in the Na-Ne scheme of x-ray lasing. The roman numeral after the element represents one plus the number of free electrons that have been disassociated from the element to form the plasma of the material. The lasers 18 and 20 are tuned to the proper intensity (see FIG. 3) to heat the layers 12 and 14 to maximize the production of Na X or Ne IX as well as to pump the Na X 1s$^2$ $^1$S to 1s2p$^1$P transition.

The layers 12 and 14 are solid Na and Ne, respectively, at the start of heating, but as heating continues and the respective plasmas form, the stages of free electrons preceding the Na X level and the Ne IX level are reached and passed. If care is not taken, too much heating will cause the desired Ne IX level to be burned through eliminating any further x-ray production. This can be avoided by limiting the laser and not allowing the Ne temperature (see FIG. 3) to reach too high of a value. (It should be noted that if a source is used to pump the Ne IX other than Na X, then population inversion is not achieved. The excited electrons are trapped at lower energy levels and essentially no x-ray generation occurs.)

The thickness, d, of the Ne layer of the ablated neon can be scaled as A/N for a fixed optical depth where A is a constant and N is the ion density. The optical depth is a function of the constant A, thickness, d, and density, N, given by $\tau = $ANd. Thus for a fixed optical depth, the thickness of the layer varies inversely with density. The thickness of the layer can then by scaled with density using the maximum allowed optical depth. The maximum 1-2 resonance line optical depth before significant reduction in population inversion occurs has been determined by P. C. Hagelstein, Lawrence Livermore National Laboratory Report UCRL-53100 (1981) to be approximately 5. This requires an ablated blowoff with a scale length not greater than the 10 $\mu$m for ion densities of $10^{20}$ cm$^{-3}$. This scale length can be increased to greater than 0.1 cm for number densities on the order of $10^{18}$ cm$^{-3}$.

Figure 4:
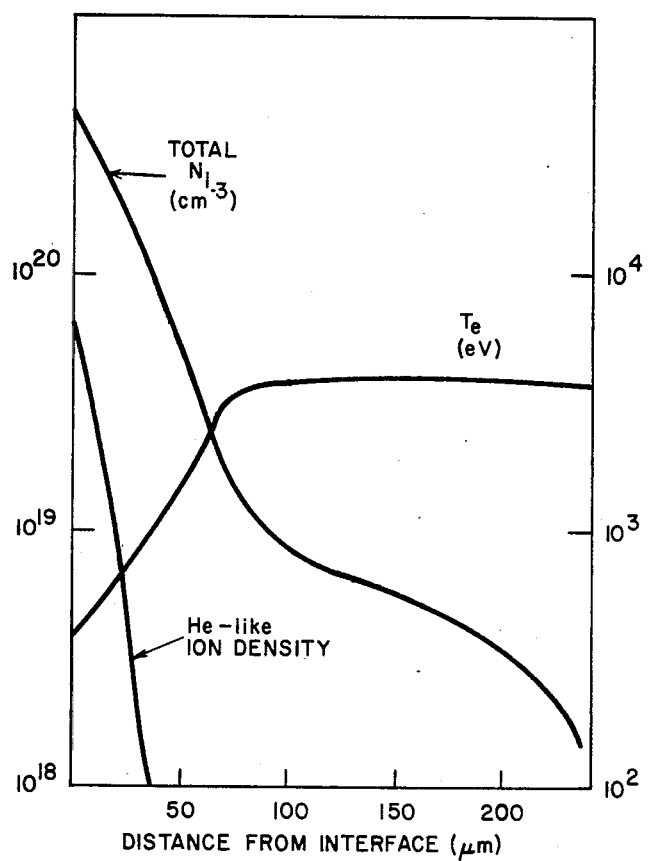
FIG. 4 is a graph of number density, temperature and He-like sodium ion density profiles for one of several possible Na-C-Ne cases.

As mentioned above, the Na-Ne combination for lasing requires a difference in the temperature and densities of the Ne and Na layer. The temperature of the lasing neon must be kept low enough to prevent burn-out of the Ne IX population. At a density of $10^{18}$ cm$^{-3}$ the maximum fractional population for Ne IX occurs at approximately 65 eV in the presence of the pump radiation. On the other hand, the pumping plasma (in this case Na) is most favorable when it is an optically thick plasma with a kinetic temperature of about 300 eV. In short, what is desired is a hot dense pumping plasma irradiating a cooler lasing plasma which is optically thin along one axis. The density and temperature profiles for the Ne-C-Na system at 100 psec after the laser peak is shown in FIG. 3. In FIG. 3, T is the temperature (where $T_e$ is the electron temperature and $T_i$ is the ion temperature) and $\rho$ is the density, both being a function of distance from the C layer, for the case, of many possible cases, where the Na/C thickness is 0.5 $\mu$m/0.5 $\mu$m, the peak laser intensity is $5 \times 10^{13}$ W/cm$^3$, the pulse time is 200 psec, the line center pumping intensity is $2.0 \times 10^3$ ergs/cm$^2$ sec Hz and the line width at half center value is $3.0 \times 10^{14}$ (Hz). The region where absorption of the line occurs in neon is seen to be roughly 100 eV for the electrons. The density in this region passes through the value $10^{-3}$ g/cm$^3$ (or $3 \times 10^{19}$ ions/cm$^3$) which is near the optimum density for gain. The sodium, on the other hand, has a temperature which varies between 100 eV and 1 keV at a density of more than $10^{-2}$ g/cm$^3$. This provides a strong punping source of He-like sodium. FIG. 4 shows the He-like ion density of the Na plasma. The He-like density is seen to peak at the carbon interface. A total of three cases is shown in table 1, which is a table of parameters for three Na-C targets. In these three cases both sides of the target are irradiated by lasers operating at 1.06 $\mu$m. The intensity on the Ne side is well below that on the Na side and is typically on the order of $10^{12}$ W/cm$^2$. If necessary the low power laser on the neon can be turned off to prevent overheating.

TABLE 1

| Case | Na/C thickness (m) | Peak laser intensity (W/cm$^2$) | Pulse time FWHM (psec) | Line center pumping Intensity (ergs/cm$^2$ sec Hz) | Pump line width at half center value (Hz) |
|---|---|---|---|---|---|
| I | 0.5/0.5 | $5 \times 10^{13}$ | 200 | $2.0 \times 10^3$ | $3.0 \times 10^{14}$ |
| II | 0.1/0.5 | $2.5 \times 10^{13}$ | 200 | $9.6 \times 10^2$ | $2.0 \times 10^{14}$ |
| III | 0.1/0.5 | $1 \times 10^{13}$ | 300 | $6.7 \times 10^2$ | $2.2 \times 10^{14}$ |

Here pulse time is the full-width-half-maximum (FWHM) time over which the external lasers are on in psec ($10^{-12}$ sec); line center pumping intensity is the intensity at the center of the Na X 11.0027 angstrom pumping line; and pumping line width is the width in Hz of the pumping line at half the maximum value at center.

Figure 5:
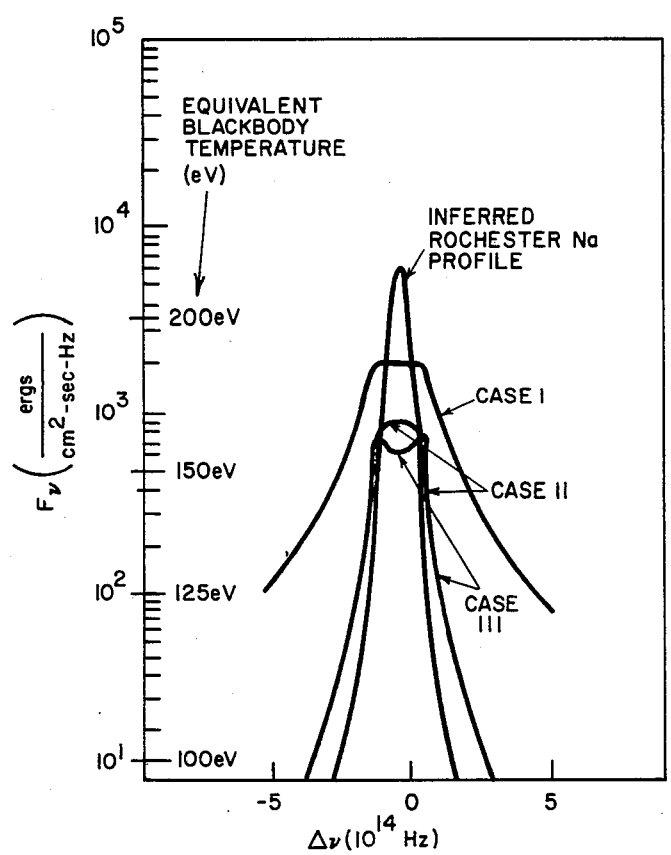
FIG. 5 is a graph of the diagnosed intensity profile for the 11 angstrom line at the Na-C interface for three cases.

A corresponding graph (see FIG. 5) shows the post processed intensity profile for the 11 angstrom pumping line at the Na-C interface. The three cases of table I are shown along with the inferred Rochester experimental profile in FIG. 5. The times for case I and case II are 100 psec after the peak of the Gaussian-shaped laser pulse. The time for case III is 300 psec, which is the rise time for the linear ramped pulse. In a 300 psec linear ramped pulse, the external lasers rise to their full values linearly in 300 psec and are subsequently held constant. The Rochester experimental profile is the diagnosed intensity profile of only a small amount of Na in a glass microballoon which has been heated by a laser. The other three cases, all having a much greater amount of Na, have a capped peak to a certain degree because of self-absorption at 11 angstroms in the cooler surrounding Na.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A lasing system for generating frequency coherent x-rays, comprising:
   a sodium layer;
   a first heating means for heating said sodium layer until Na X is present;
   a neon layer, wherein said neon layer is kept frozen until laser heating begins;
   a second heating means for heating said neon layer until Ne IX is present, so that Ne IX is pumped by Na X to achieve the necessary population for lasing to occur;
   a thermal transparent buffer layer located between and in contact with said sodium and neon layers, wherein said buffer layer absorbs thermal waves from said sodium layer and wherein said neon layer is maintained at a lower temperature and density than said sodium layer for lasing to occur; and
   means for containing said sodium-buffer-neon layered combination.

2. The lasing system as recited in claim 1 wherein the sodium layer is at least 0.5 $\mu$m thick, the thermal buffer layer is carbon and is at least 0.5 $\mu$m thick, and the neon layer has a maximum resonance line optical depth of less than 5.

3. The lasing system as recited in claim 1 wherein said first heating means for heating said neon layer until Ne IX is present comprises a laser having power less than or equal to $10^{12}$ W/cm$^2$ and said second heating means for heating said sodium layer until Na X is present comprises a laser having a power greater than or equal to $5 \times 10^{13}$ W/cm$^2$.

4. A method for generating frequency coherent lasing in the x-ray wavelength comprising the steps of:
   heating a sodium layer until Na X is present;
   heating a frozen neon layer until Ne IX is present, wherein said frozen neon layer is kept frozen until laser heating begins;
   providing said neon layer in close proximity to said sodium layer with a transparent thermal buffer layer in between and in contact with both of said sodium and neon layers for absorbing a thermal wave produced in said sodium layer, wherein said neon layer is maintained at a lower temperature and density than said sodium layer for lasing to occur, whereby said neon layer is photopumped with radiation from said heated sodium layer to produce lasing of said neon layer.

5. The method as recited in claim 4 wherein said step of heating said sodium layer is performed using a laser having power greater than $5 \times 10^{13}$ W/cm$^2$, and wherein said step of heating said neon layer comprises lasing said frozen neon layer with a laser having power less than or equal to $10^{12}$ W/cm$^2$.

6. The method as recited in claim 5 wherein said sodium layer is at least 0.5 um thick, said buffer layer is carbon and is at least 0.5 um thick, and said neon layer has a maximum resonance line optical depth of less than 5.

* * * * *

UNITED STATES PATENT OFFICE
CERTIFICATE OF CORRECTION

PATENT NO. : 4,803,687

DATED : 7 February 1989

INVENTOR(S) : Frederick Cochran, Jack Davis and John Apruzese

It is certified that error appears in the above-identified patent and that said Letters Patent is hereby corrected as shown below: Title page:

In the listing of inventors change John APRUGESE to John APRUZESE.

Signed and Sealed this

Twenty-fifth Day of July, 1989

Attest:

DONALD J. QUIGG

Attesting Officer

Commissioner of Patents and Trademarks